Feb. 8, 1938.　　　S. T. WILLIAMS　　　2,107,405
ROTATING JOINT FOR RUNNING INFLATION
Filed Jan. 25, 1934
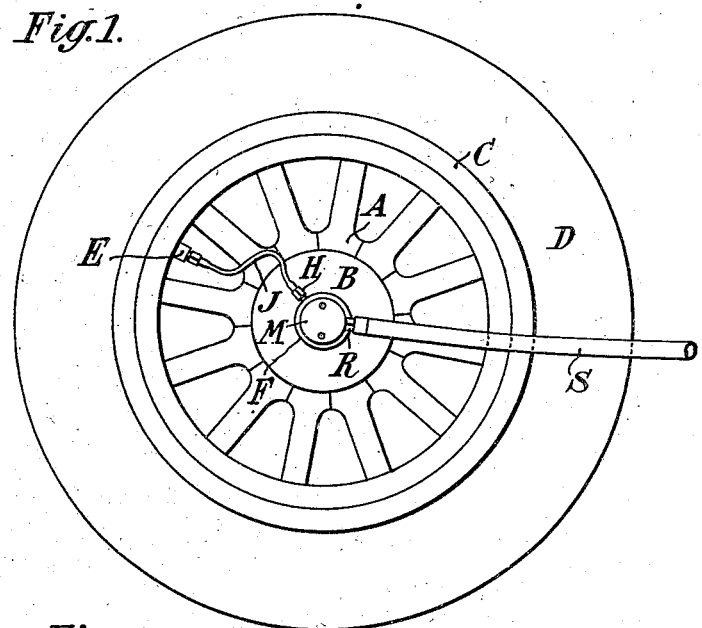
Fig.1.
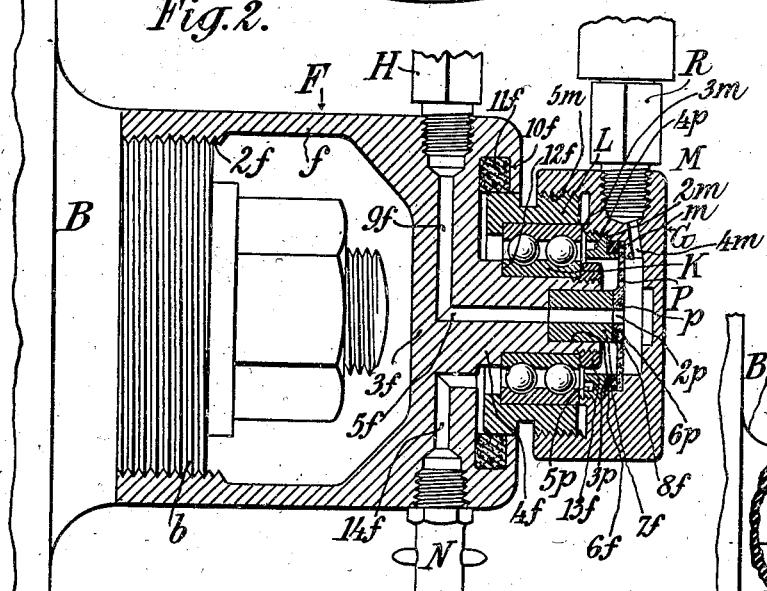
Fig.2.
Fig.3.
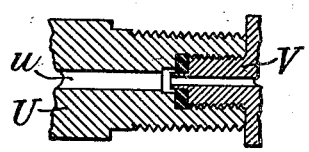
Fig.4.
INVENTOR
Selden T. Williams,
BY
Fraser, Myers & Manley.
ATTORNEYS Patented Feb. 8, 1938

2,107,405

UNITED STATES PATENT OFFICE 2,107,405

ROTATING JOINT FOR RUNNING INFLATION

Selden T. Williams, Bellerose, N. Y., assignor to A. Schrader's Son, Incorporated, Brooklyn, N. Y., a corporation of New York Application January 25, 1934, Serial No. 708,185

8 Claims. (Cl. 152—11)

My present invention relates to a fluid communicating rotating joint, and aims to provide certain improvements therein. More particularly it relates to a rotating joint on a wheel hub through which a pneumatic tire mounted on the wheel while in motion can be maintained properly inflated at all times.

The idea of inflating and maintaining the desired pressures in pneumatic tires upon vehicle wheels while in motion has been repeatedly proposed, and many patents are extant showing devices for accomplishing this. None of these devices to my knowledge have reached the market, but all rotating joints with which I am familiar are expensive, complicated and incapable of meeting the service requirements of commercial operation.

Accordingly an object of my invention is to provide a rotating joint which will consist of few parts, be sturdy in construction so as to withstand service conditions for long periods, and which will be efficient in operation. A further object is to provide such rotating joint which can be assembled into new wheel installations or which can be assembled in units for attachment to present wheel structures. A further object is to provide a rotating joint so constructed as to overcome the tendency to wear, overheating or inoperativeness from other causes. A further object is to provide such rotating joints for vehicle wheels which will not seriously interfere with or impede the operation of removing a tire from the wheel or with the removeability of the wheel as a whole from the axial spindle.

The foregoing and other objects of my invention not specifically enumerated, I accomplish by providing a rotating joint comprising essentially two coaxially disposed, relatively rotatable units, one of which carries an impervious, flexible diaphragm preferably having self-lubricating characteristics and which diaphragm is held in fluid-tight engagement against a bearing face on the other unit, and wherein the pressure of the fluid conducted by said joint acts upon the diaphragm to promote the holding thereof against the bearing face to more effectively insure the joint against leakage. The invention also embodies other features of novelty which will be better understood from the detailed description which follows, when considered in conjunction with the accompanying drawing showing two preferred embodiments of my invention, and wherein:—

Figure 1 shows a side elevation of a pneumatic tired vehicle wheel having my invention incorporated therewith.

Fig. 2 is a diametrical section with parts shown in elevation, of a rotating joint affixed to a driving or rear wheel of a vehicle.

Fig. 3 is a diametrical section with parts shown in elevation, showing a slight modification of the invention as applied to a front wheel of a vehicle.

Fig. 4 is an enlarged sectional detail of the invention shown in Fig. 3.

Referring to the drawing, let A indicate a vehicle wheel of the artillery type having a hub B and a rim C on which is mounted a pneumatic tire D having a valve stem E extending inwardly through the rim. The wheel A may be of any desired construction and does not, per se, constitute a part of my invention.

The rotating joint of my invention essentially consists of two units which may be designated as F and G. The unit F, as shown in Fig. 2, consists of a cap-like member $f$ fitted over a threaded portion $b$ of the hub through the medium of screw-threads $2f$ on the cap member. The cap member at its outer end is formed with a thickened wall $3f$ having an outwardly-directed axial extension $4f$, the latter having an axial bore $5f$, which, at its outer end is enlarged, as indicated at $6f$, and in which is force-fitted a tubular plug of tool steel or the like $7f$, which projects slightly beyond the end of the extension and has an outer end or bearing face $8f$ which is preferably smooth and highly polished. Communicating with the axial bore $5f$ is a radial bore $9f$, which, at its outer end is enlarged and internally screw-threaded, and within which is fitted a coupling H connected to one end of a tube J, the other end of which is detachably connected to the nipple end of the valve stem E. The cap end $3f$ at its peripheral outer end is formed with an inwardly-directed flange $10f$ whereby an annular recess is provided in the outer end of the cap and within which is positioned a dust ring $11f$ formed of soft felt or other suitable material.

The extension $4f$ on its outer periphery has a portion adjacent its outer end of reduced diameter to provide a shoulder $12f$, and upon said reduced portion is mounted an annulus K containing ball bearings or other anti-friction means, the said annulus K being contained within a bearing housing L, which, at its inner end, is of a diameter to snugly fit within the flange $10f$ and engage the dust ring $11f$. The housing L at its outer end is externally screw-threaded to accommodate a secondary cap member or diaphragm housing M. The anti-friction bearing annulus K is held upon the extension member $4f$ by a nut 13f. To lubricate the anti-friction means, the chamber provided by said means, the bearing housing L, and the extension member 4f are adapted to receive lubricant through a communicating duct 14f, which, at its outer end terminates in an enlarged, internally screw-threaded socket into which is threaded a fitting N adapted to receive a well known form of grease gun.

The unit G consists of the cap-like portion M, which may be termed a diaphragm housing, which on its inner side is of progressively larger diameters to provide a plurality of annular shoulders m, 2m and 3m. Mounted within the cap and held against the shoulder m is an impervious, flexible resilient diaphragm P, which, at its central portion p, is of greater thickness than at its outer periphery and has through its central portion a hole 2p. The diaphragm P is held in leaktight engagement within the cap through the medium of a packing gasket 3p and a lock nut 4p provided with spanner wrench openings 5p.

The diaphragm P forms with the outer end of the cap M a fluid pressure chamber which has a radial duct 4m, which, at its outer end, is enlarged and internally screw-threaded and accommodates a coupling fitting R to which is connected a fixed hose or pipe S which leads to a tank or reservoir, a power pump, a gauge on the instrument board or other suitable indicating or fluid pressure supply means (not shown). The connection provided by the cap M and the pipe S is such as will hold the unit G stationary, where the unit F is rotatable, and vice versa.

The unit G is mounted upon the unit F by the engagement of the internal screw-threads 5m within the cap M over the external screw-threads on the bearing housing L, the shoulder or wall 3m within the diaphragm housing acting as an abutment for limiting the inward movement of the unit G over the unit F. Of course when said stop abutment is reached, or even prior thereto, the bearing face 6p on the diaphragm will be tightly pressed against the bearing face 8f of the plug 7f to provide a leak-tight seal between said parts. Preferably, the tightening engagement is such as will cause a slight dishing of the diaphragm which will give the initial pressure at the contacting surfaces of the diaphragm with the end bearing face 8f.

Preferably the diaphragm P comprises a hard, synthetic resin, and that used by applicant is formed of "Micarta", either plain or graphitized, or other suitable analogous material. It is my understanding that "Micarta" consists of superposed plies of woven textile material impregnated with a phenolic condensation product such as "Bakelite" and the like, and subjected to considerable heat and pressure. I have found these substances to be self-lubricating, effective and subject to but very slight wear. In fact, in a test carried out with a joint of this type which was run the equivalent of 100,000 miles on a test machine, the degree of wear on the diaphragm was not enough to cause leakage at the bearing surfaces. The slight dishing of the diaphragm, as described above, also functions to create a tension upon the diaphragm which operates to hold the bearing surface thereof in engagement with the plug. I have found that the air pressure within the chamber at the rear of the diaphragm also contributes toward maintaining the pressure-tight seal between the bearing faces of the diaphragm and the plug.

In Figs. 3 and 4 of the drawing, wherein I have shown the invention as applied to the front wheel of a vehicle, the construction of the rotating joint with respect to the diaphragm mounting, its engagement with a plug and the anti-friction mounting between the fixed and rotating parts, are substantially the same as that described with respect to Fig. 2. The primary point of difference is that the fixed part in this embodiment of the invention is the axle spindle U which has an axial bore u therethrough and which, at its outer end, is internally screw-threaded and receives in leak-tight engagement therewith a second plug V, which too has an axial bore therethrough. The plug V corresponds to the plug 7f of Fig. 2 excepting that the plug V is stationary and the plug 7f is rotatable.

The wheel being mounted to freely rotate over the fixed axle spindle U, must rotate in unison with the rotatable part of the rotating joint, and therefore the diaphragm housing M' has an air take-off tube W which passes through a hub cap F' and connects at its other end (not shown) with the pneumatic tire valve stem. To provide a suitable drive between the tube W and the hub cap F, said tube is caused to pass through a guide opening w in the hub cap F'. The hub cap is suitably secured to the hub B' through the intermediary of a ring X which is screw-threaded on the hub and secured to the hub cap by bolts x. It will thus be seen that the construction in Fig. 3 is substantially that of Fig. 2 with the fixed and rotatable parts in reverse arrangement.

While the foregoing detailed description has been primarily confined to a rotating joint whereby fluid communication is at all times established between a rotating body containing such fluid pressure and a fixed reservoir or source of supply of such pressure, it will be understood that the present invention is primarily intended to provide installations in motor vehicles whereby the pressure in each of the tires can be indicated by a gauge mounted on the dash so as to enable the driver to know at a glance the pressures in his tires at all times. It it also intended for conjoint use with means in the vehicle for supplying air to any tire while in motion or to vent air from any tire if such is found to be over-inflated. As many devices have been proposed for controlling these factors, none have been herein specifically illustrated.

From the foregoing detailed description it will be apparent that I have provided a device of the character described which is capable of fulfilling all the objects of the invention set forth in the opening statement of this specification, and while I have shown and described but two embodiments of my invention, I do not wish to be limited to the details of construction disclosed, since it will be apparent to one skilled in the art that the same may be varied within the range of engineering skill without departing from the spirit of the invention.

What I claim is:

1. A device of the character described comprising two coaxially disposed, relatively rotatable units, each having means for connection with a source or reservoir of fluid pressure, one of said units having an impervious, flexible, peripherally held diaphragm therein, the other unit having an axial extension with an end face against which said diaphragm engages, said diaphragm and axial extension having aligned openings therethrough, and said units being assembled together in a manner to normally hold said diaphragm in fluid-tight engagement against said end face independently of the fluid pressure or any supplemental spring means.

2. A communicating fluid-tight joint between two relatively rotatable parts, comprising a hard, smooth bearing face on one of the parts, and a flexible diaphragm, comprising a hard, synthetic resin, having a smooth bearing face complemental to the bearing face on the other part, and means for holding said bearing faces in fluid-tight engagement.

3. A communicating fluid-tight joint between two relatively rotatable parts, comprising a hard, smooth bearing face on one of the parts, and a flexible, self-lubricating diaphragm, comprising a hard, synthetic resin, having a bearing face complemental to the bearing face on the other part, and means for holding said bearing faces in fluid-tight engagement.

4. A communicating fluid-tight joint between two relatively rotatable parts, comprising a hard, smooth bearing face on one of the parts, and a flexible diaphragm, comprising a graphitized, phenolic condensation product, having a bearing face complemental to the bearing face on the other part, and means for holding said bearing faces in fluid-tight engagement.

5. A communicating fluid-tight joint between two relatively rotatable parts, comprising a hard, smooth bearing face on one of the parts, and a flexible diaphragm comprising a phenolic condensation product, having a bearing face complemental to the bearing face on the other part, and means for holding said bearing faces in fluid-tight engagement, said parts having communicating fluid passages through their respective bearing faces.

6. A device of the character described, comprising a cap-like member having an end wall formed with an outwardly-directed, axial extension and an axial passage in said extension communicating with a passage in the end wall leading to the periphery thereof, a second cap-like member having an impervious flexible diaphragm peripherally held therein and providing a fluid pressure chamber having a passage leading to the exterior of the cap, said diaphragm having an axial opening therethrough in direct communication with the axial passage in the axial extension, and means for connecting said cap-like members together in a dust-excluding manner with the diapragm in fluid-tight pressing engagement against the end of the extension and with the openings in said diaphragm and said extension member in alignment.

7. A device of the character described, comprising a cap-like member having an end wall formed with an outwardly-directed axial extension having an axial passage therein communicating with a passage in the end wall leading to the periphery thereof, a second cap-like member having an impervious, flexible diaphragm peripherally held therein and providing a fluid pressure chamber having a passage leading to the exterior of the cap, said diaphragm having an axial opening therethrough, an annulus of anti-friction bearings between the axial extension and the second cap-like member, a ring of packing material between said annulus and said first cap-like member and means operative through the anti-friction annulus and ring of packing material for connecting said cap-like members together in a dust-excluding manner with the central portion of the diaphragm in normally fluid-tight pressing engagement against the end of the extension and with the openings in said diaphragm and said extension member in communication.

8. A device of the character described, comprising two coaxially disposed relatively rotatable units, each having means for connection with a source or reservoir of fluid pressure, one of said units being a housing having an impervious resilient flexible diaphragm peripherally held therein, said diaphragm having a thickened central part with a smooth plane bearing face, the other unit having an axial extension with a plane smooth bearing face against which the bearing face on the thickened part of the diaphragm is held in fluid-tight pressing engagement when the units are assembled, and means independent of the fluid pressure or any supplemental spring means for holding said units in fluid-tight assembled relation.

SELDEN T. WILLIAMS.